United States Patent [19]
Dew et al.

[11] Patent Number: 5,315,463
[45] Date of Patent: May 24, 1994

[54] DISK FILE HAVING THERMAL EXPANSION RING FOR ENSURING DISK/HUB CONCENTRICITY

[75] Inventors: Graham N. Dew, Winchester; Anthony R. Hearn, South Wonston; David J. Sebborn, Eastleigh; Julian T. Young, Medstead, all of England

[73] Assignee: International Business Machines Corporation, Armonk, N.Y.

[21] Appl. No.: 761,864

[22] PCT Filed: Jan. 8, 1990

[86] PCT No.: PCT/GB90/00020
§ 371 Date: Oct. 1, 1992
§ 102(e) Date: Oct. 1, 1992

[87] PCT Pub. No.: WO91/11004
PCT Pub. Date: Jul. 25, 1991

[51] Int. Cl.$^5$ .............................................. G11B 17/08
[52] U.S. Cl. ........................... 360/98.08; 360/99.12
[58] Field of Search ................. 360/98.08, 99.12, 135

[56] References Cited

U.S. PATENT DOCUMENTS

| | | | |
|---|---|---|---|
| 4,717,977 | 1/1988 | Brown | 360/98.08 |
| 4,945,432 | 7/1990 | Matsudaira | 360/98.08 |

*Primary Examiner*—A. J. Heinz
*Attorney, Agent, or Firm*—Richard E. Billion; Roy W. Truelson

[57] ABSTRACT

A disk file includes an expansion ring attached to the wall of the hub and which is located between the lowermost disk of the disk stack and the hub flange. A circular ridge concentric with the hub is formed on the ring and engages the underside of the disk. The ring is adapted so that the thermal expansion of the ring is substantially equal to that of the aluminum disk at the position of contact between the two. A washer interposed between ring and flange allows the ring to move freely relative to the flange. During thermal cycling, the ring and disk move at the same rate at the point of contact, the ring ensuring that the disks remain concentric with the hub throughout the range of disk file operating temperatures.

17 Claims, 4 Drawing Sheets

DISK FILE HAVING THERMAL EXPANSION RING FOR ENSURING DISK/HUB CONCENTRICITY

TECHNICAL FIELD OF THE INVENTION

This invention relates to the field of disk files and more specifically to means for ensuring that the recording disk tracks maintain concentricity with the spindle of the disk motor during temperature changes within the disk file.

BACKGROUND OF THE INVENTION

The trend in disk file design is constantly towards higher track densities allowing a greater amount of information to be recorded on a single disk. In a common type of disk file, a number of disks are arranged in a stack with spacers in between each disk. This stack of disks is then supported on a surface e.g. a shelf extending radially from the hub for rotation about an axis passing through the spindle of the disk motor. An axial force is applied to clamp the disk stack in position. In such disk drives, it is important to ensure that once information has been written to each of the disks or to a dedicated servo disk, there is minimal or no shift of the disks out of concentricity with the axis of rotation.

In disk files where the disks and the portion of the hub supporting the disks are made of materials having different coefficients of thermal expansion, the different expansions during thermal cycling cause large forces to be generated at the hub to disk interface. When the thermal expansion forces become large, the friction force generated by the clamp load is insufficient to restrain the expansion forces and the disks can shift radially. This movement is usually unpredictable in magnitude and direction and can cause the disks to move off the axis of rotation. The resultant track eccentricity may lead to data already on the disk becoming irretrievable.

There have been several attempts described in the art directed to solving this problem.

GB 2 163 525 describes a washer made from MYLAR (registered trade mark) located between the lowermost disk and the hub flange (the flange and the disc having different coefficients of thermal expansion). Changes in temperature result in relative movement between the disc and the flange which results in shearing of the washer. The washer acts (by resilience) to restore the disk to its original position when the temperature returns to its original value however this has been found not to be repeatable in practice.

U.S. Pat. No. 4,754,351 describes a different solution wherein axial strips define a clearance between the spindle and the disc and act so as to maintain a substantially uniform clearance upon thermally induced differential expansion of the disk.

U.S. Pat. No. 4,717,977 describes the use of an aluminum sleeve located around the steel motor cylinder, the engagement between the two parts being limited to one section near the centre of the overlapping surfaces. In this case, motor size is restricted by the need for the additional aluminum sleeve.

PCT application WO 88/06781 describes an in-hub motor assembly for a disk drive wherein the disks are mounted on a hollow aluminum spindle which contains a removable steel sleeve within which the motors magnets are mounted. Because the spindle is aluminum, thermal distortion caused by differential thermal expansion is eliminated but again, motor size is restricted.

Disclosure of the Invention

While the prior art describes a number of proposals for overcoming the problems caused by unpredictable disk shift, there is an ongoing requirement for a system which is effective, compact and which is reliable throughout the lifetime of a disk file.

Accordingly the invention provides a disk file including a disk assembly comprising a hub, rotatable about a central axis, having a wall and a peripheral flange, at least one data storage disk supported by the flange, the disk and flange being made from materials having dissimilar coefficients of thermal expansion, clamping means for clamping said disk to said flange, compensation means located between a first surface of the flange and the opposed surface of the disk, for ensuring that the disk remains concentric with the hub during temperature changes, characterised by the compensation means including expansion means having a coefficient of thermal expansion different to that of the hub, the expansion means being attached to the hub wall and having raised portions concentric with the hub and in non-slipping contact with the surface of the disk, the compensation means further comprising means interposed between the expansion means and flange for allowing the expansion means to move radially relative to the flange during temperature changes.

The expansion means is designed so that during changes in temperature, there is a reduction in the differential expansion between the disk an the expansion means as compared to that which would exist between disk and hub flange. In this way the frictional force generated at the disk/expansion means interface by the differential expansion is reduced thereby reducing the risk of unpredictable disk shift. In order to allow the expansion means to move with the disk, it is necessary to provide means interposed between the expansion means and the hub flange. During the changes in temperature, the radial stiffness of the expansion means, which is attached to the hub wall, gives rise to centralising forces which ensure that the expansion means, and therefore the disk, remains in concentricity with the hub.

In a preferred disk file, the material of the hub has a lower coefficient of thermal expansion than that of the disk, the expansion means being made of material having a higher coefficient of thermal expansion than that of the disk. In a common type of magnetic disk file, the disk is of aluminum and the hub is of steel. The higher thermal coefficient of the expansion means (e.g. zinc or magnesium) means that 'matching' of the expansion rates of the disk and the expansion means can be achieved i.e. the frictional forces generated between disk and expansion means can be reduced.

The present invention may also be employed in an alternative system e.g. optical disk storage wherein the hub is made of a material having a higher coefficient of thermal expansion than the disk e.g. where the hub may be of aluminum and the disk is of plastic or glass. In such a system, the hub flange would expand at a faster rate than the disk and the expansion means would be designed to have a coefficient of thermal expansion lower than that of the hub in order to reduce the frictional forces generated at the disk/expansion means interface.

In some disk files where space is not at a premium it is possible that the expansion means could comprise a simple annular ring which fits over and is connected to the hub wall. The properties (e.g. coefficient of thermal expansion) and geometry of the ring would be chosen to achieve the reduction in differential expansion at the ring/disk interface.

However, given the geometrical constraints of many current disk files, it is more likely that a more sophisticated expansion means design is required to achieve matching of the expansion rates at the position of contact between disk and expansion means. Accordingly, in a preferred disk file, the expansion means comprises an annular ring including a resilient weakened portion located radially inward of the raised portions. The raised portions preferably take the form of a circular ridge concentric with the hub. In this way, some flexibility is built into the expansion means reducing the differential thermal expansion between disk and surface with which it is in contact. The weakened section allows the outer portion of the expansion means to expand more freely.

In a preferred embodiment, the weakened section comprises a wall portion extending laterally from a flat outer portion including the raised portions. During changes in temperature, the wall flexes.

In an alternative embodiment, the weakened section comprises a plurality of slots cut into the ring. These act in essentially the same way as the wall portion of the first embodiment.

In any of the described embodiments, it is preferred that the means interposed between expansion means and hub flange is a washer, preferably of polyethylene terepthalate or polytetrafluoroethylene (PTFE).

The invention will now be described by way of example only with reference to the accompanying drawings.

DETAILED DESCRIPTION OF THE INVENTION

Figure 1:
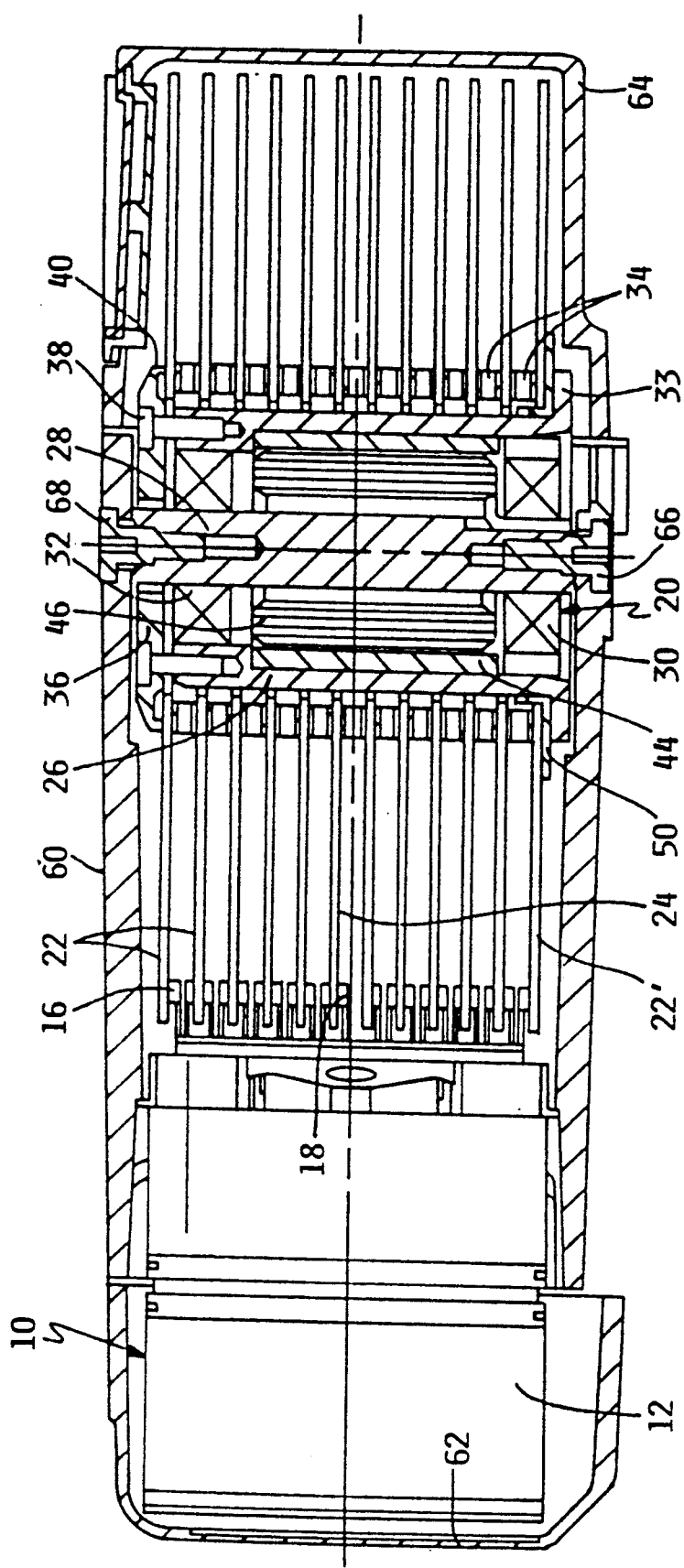
FIG. 1 is a sectional view of a disk file according to the present invention.

The disk file shown in FIG. 1 comprises two major assemblies. These are a linear actuator of the voice coil motor type 10 and a disk stack assembly 20 which incorporates an in-hub motor. The linear actuator and disk stack assembly are mounted in a rigid base casting 60 which forms part of the disk file enclosure. The enclosure is completed by end covers 62, 64 removably attached to each end of the base casting.

The linear voice coil actuator shown in FIG. 1 consists of a fixed magnet assembly 12 and a movable carriage assembly 14 supporting a head stack comprising twenty read/write assemblies 16 for accessing data from eleven rigid magnetic disks 22 and one servo head 18 for reading servo information from a dedicated servo disk surface 24. In operation, a signal in the form of a current is supplied to the coil, the current interacts with the magnetic field set up by the magnet assembly thereby effecting movement of the carriage and attached head stack.

The disk stack assembly 20 comprises a cylindrical hub 26 mounted for rotation about a stationary spindle 28 by means of a pair of bearings 30,32 attached to respective ends of the spindle. The hub includes a peripheral flange 33 at its bottom end on which is supported a stack of twelve magnetic disks 22,24 separated by spacer rings 34. The disk stack is clamped to the hub by means of a clamping ring 36 which is secured to the top of the hub by screws 38 located in recesses in the upper surface of the clamping ring. The clamping ring includes a circumferential rim 40 which contacts the topmost disk in the stack.

As can be seen in FIG. 1, the disk stack assembly is mounted in the base casting 60 by means of screws 66,68 which pass through two holes located top and bottom in the casting into holes located in the top and bottom of the spindle.

The motor for driving the disks is located in the cavity defined by the bearings and the inner surface of the hub. The inner surface of the hub carries a cylindrical multipole bar magnet 44 which forms the rotor of the brushless DC motor. The stator 46, consisting of windings on a laminated core, is attached to the stationary spindle. The magnetic circuit is completed by the hub and spindle which are made from a soft magnetic material such as steel. The use of the hub and spindle as part of the magnetic circuit increases the compactness of the in-hub motor.

Figure 2:
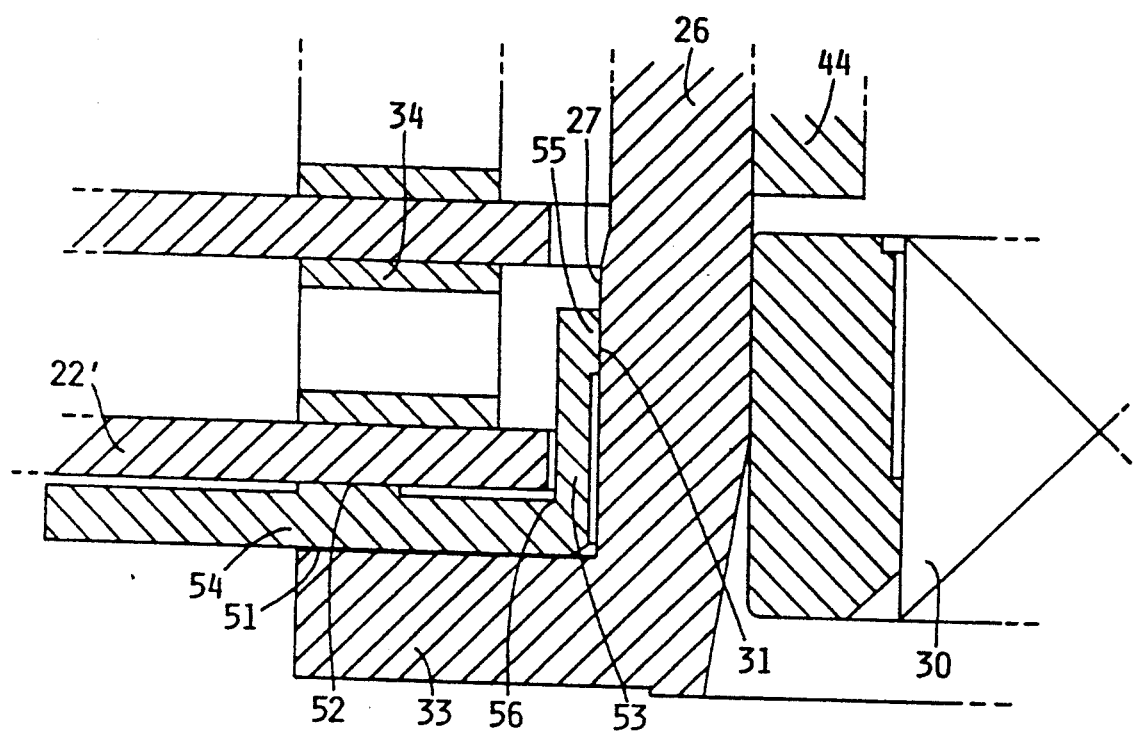
FIG. 2 is a sectional view of a first embodiment of the expansion ring as employed in the disk file according to the present invention.
Figure 4:
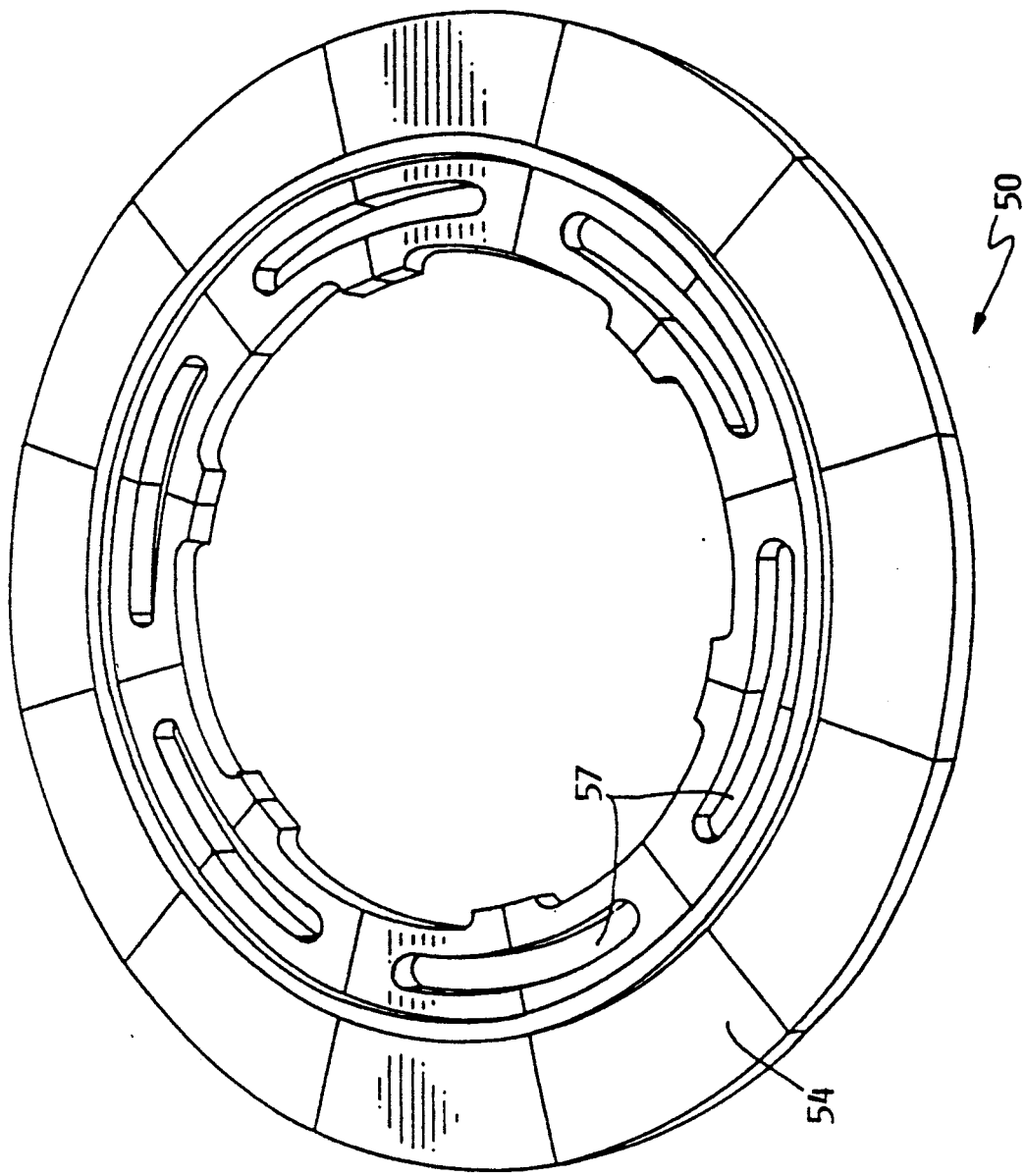
FIG. 4 is an enlarged perspective view of a second embodiment of the expansion ring.

As has been previously described, during temperature changes in the disk file, the different rates of expansion of the disks and hub flange can lead to unpredictable disk shift (radial mispositioning). This problem is solved in the design described herein by means of an expansion ring 50 and polyethylene terephthalate washer 51 (having a typical thickness of 75 microns) located between the lowermost disk 22' in the stack and the hub flange. FIG. 2 shows part of the lower section of the disk stack assembly including one embodiment of the expansion ring. FIG. 4 shows a perspective view of a second embodiment of the expansion ring. In each embodiment the expansion ring, which is firmly attached to the hub wall 27, e.g. by adhesive or press fit, engages the underside of the disk by means of a radial ridge 52 formed on the ring. The position of this ridge is defined with reference to the position of contact 41 between the topmost disk in the stack and the rim 40 on the clamping ring in order to ensure that the disks in the stack remain parallel to one another. The ridge engages the disk on a narrow seat to avoid differential thermal expansion problems between the disk and the ridge itself.

The thermal characteristics of the expansion ring are designed so that at the ridge, the expansion rates of the disk and ring are substantially the same. In this way, when the disk and expansion ring are clamped together by the previously described clamping ring, the frictional forces generated between the two by differential thermal expansion are much reduced in comparison to those which would exist between the disk in direct contact with the steel flange. As a consequence, the clamping force required to ensure that the frictional forces do not cause unpredictable disk shift is reduced. However, because the material of the ring expands at a faster rate than the underlying steel of the flange expands, it is necessary to ensure that the ring is able to move freely in a radial direction with respect to the hub flange. The washer interposed between the lower surface of the ring and the upper surface of the hub flange acts as a bearing surface to allow movement of the ring relative to the flange. Thus, because the ring and therefore the disks can move relative to the flange, there is little frictional force generated at the ring/flange interface which would itself cause unpredictable disk shift.

Centralising forces in the ring ensure concentricity between ring and hub is maintained. The ring is designed to have high radial stiffness in order to achieve large centralising forces.

During temperature increases, the materials of the hub, ring and disk expand at different rates. Because the ring is attached to the hub, the free movement of the ring is restrained by the lesser expansion rate of the steel (approximately 11 ppm/degree C.). Thus in order to achieve expansion matching, it is necessary for the ring to have a higher coefficient of thermal expansion than the disk. Materials having such a coefficient of thermal expansion include magnesium and zinc (both approximately 27 ppm/degree C.).

In the disk file of FIG. 1 and those of a similar type incorporating in-hub motors, there is a limited amount of space between the outer surface of the hub and the position of the ridge. In such disk files, in order to overcome the restraining effect of the hub, it is necessary to 'decouple' the ring from the hub to allow the outer portion of the ring, i.e. the flat portion including the ridge, to move more freely. This is achieved by weakening a portion of the ring between hub and ridge.

Figure 3:
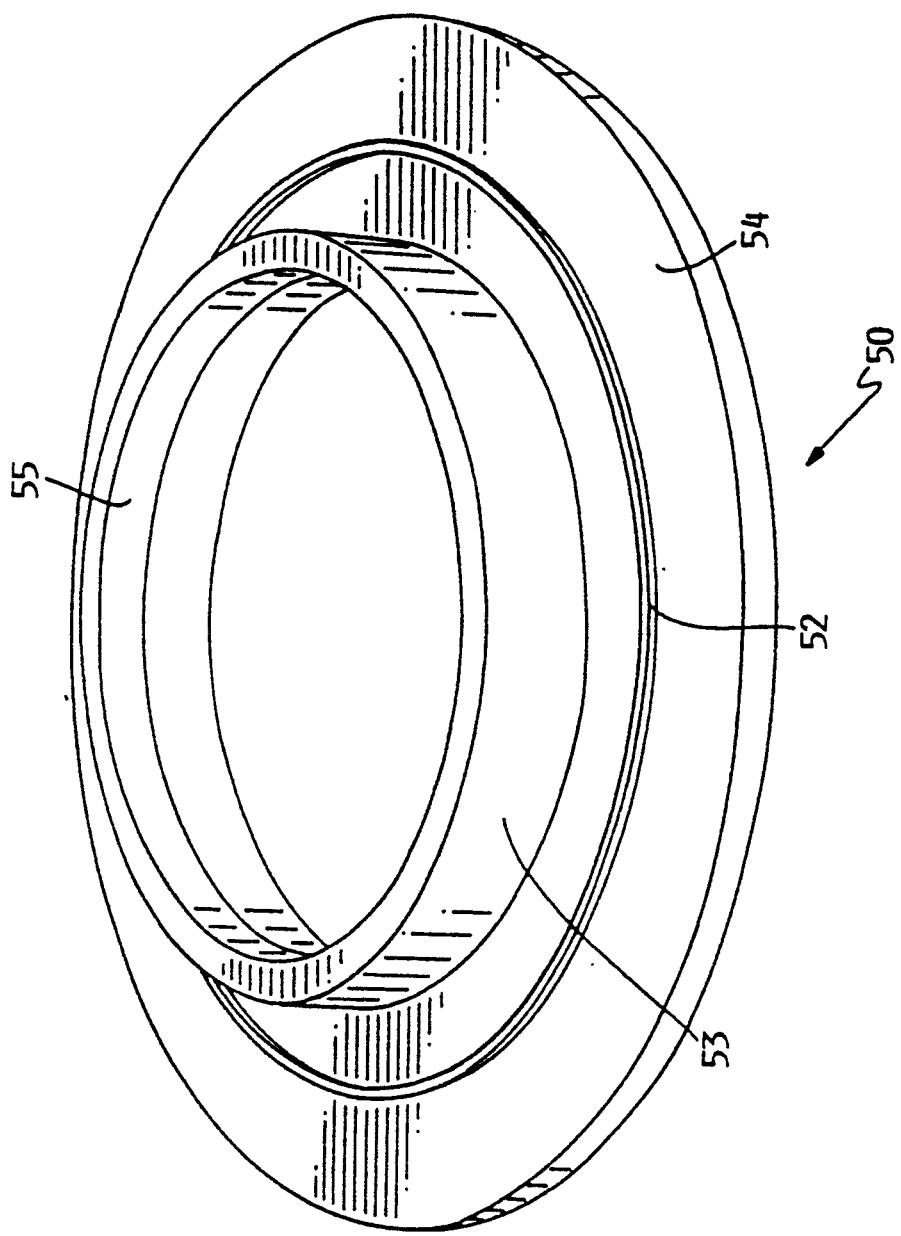
FIG. 3 is an enlarged perspective view of the expansion ring of FIG. 3.

FIGS. 1, 2 and 3 show a ring structure which incorporates such a weakened portion in the form of a vertical wall section 53. In cross section, the ring is in the form of a step, with the vertical wall section joining the flat outer portion 54 of the ring to the portion of the ring 55 which is attached to the hub. The wall extends laterally from the outer portion into the cavity between the inner surface of the disk and the hub.

During temperature increases, the junction 56 between the ring vertical wall and ring outer portion moves radially outwards, the wall flexing to allow free movement of the ring outer portion thereby achieving the expansion matching requirement. When the temperature decreases, the ring contracts and the wall returns to its original position, centralising forces within the ring ensuring that the disks and hub maintain concentricity.

FIG. 4 shows a perspective view of an alternative ring design wherein the inner portion of the ring is 'weakened' by means of a number of slots 57 formed in the ring. These have essentially the same effect as the wall section of FIG. 4 allowing the outer portion of the ring to move more freely unrestrained by the hub. The size and number of the slots is designed to achieve the required expansion matching.

What is claimed is:

1. A disk file including a disk assembly (20) comprising:
    a hub (26), rotatable about a central axis, having a wall (31) and a peripheral flange (33);
    at least one data storage disk (22) supported by the flange, the disk and flange being made from materials having dissimilar coefficients of thermal expansion;
    clamping means for clamping said disk to said flange, said clamping means applying a clamping force against said flange in an axial direction; and
    compensation means (50, 51) located between a surface of the flange and an opposed surface of the disk, for ensuring that the disk remains concentric with the hub during temperature changes, said compensation means further including:
    expansion means having a coefficient of thermal expansion different to that of the hub, the expansion means being attached to the hub wall and having raised portions (52) concentric with the hub and in non-slipping contact with the surface of the disk (22'), and
    means (51) interposed between the expansion means and flange for allowing the expansion means to move radially relative to the flange during temperature changes.

2. The disk file as claimed in claim 1 wherein the material of the hub has a lower coefficient of thermal expansion than that of the disk, the expansion means being made of a material having a higher coefficient of thermal expansion than that of the disk.

3. The disk file as claimed in claim 2 wherein the hub is of steel, the disk is of aluminum and the expansion means is of magnesium or zinc.

4. The disk file as claimed in claim 1 wherein the expansion means comprises an annular ring which fits over and is attached to the hub wall.

5. The disk file as claimed in claim 1 wherein said expansion means comprises an annular ring having a resilient weakened section (54) located radially inward of the raised portions on said annular ring.

6. The disk file as claimed in claim 5, the weakened section comprising a wall portion extending laterally from a flat outer portion.

7. The disk file as claimed in claim 5, the weakened section comprising a plurality of slots (57) concentric with the hub.

8. The disk file as claimed in claim 5 wherein the means interposed between flange and expansion means is a washer.

9. The disk file as claimed in claim 1 wherein the raised portions comprise a circular ridge.

10. The disk file as claimed in claim 8 wherein the washer is of polyethylene terephthalate or polytetrafluoroethylene.

11. A disk file including a disk assembly comprising:
    a hub, rotatable about a central axis, having a wall and a peripheral flange;
    at least one data storage disk supported by the flange, the disk and flange being made from materials having dissimilar coefficients of thermal expansion;
    clamping means for clamping said disk to said flange; and
    compensation means located between a surface of the flange and an opposed surface of the disk, for ensuring that the disk remains concentric with the hub during temperature changes, said compensation means including:
    an annular ring having a coefficient of thermal expansion different to that of the hub, said ring comprising a substantially flat annular outer portion concentric with the hub, a raised portion projecting from the substantially flat annular outer portion, said raised portion being concentric with the hub and in non-slipping contact with the surface of the disk, and a resilient weakened section located radially inward of the raised portion and coplanar with the outer portion, said resilient weakened section being in contact with the hub wall.

12. The disk file of claim 11, wherein said compensation means further includes means interposed between the expansion means and flange for allowing the expansion means to move radially relative to the flange during temperature changes.

13. The disk file of claim 11, wherein the weakened section comprises a plurality of slots concentric with the hub.

14. The disk file of claim 11, wherein the material of the hub has a lower coefficient of thermal expansion than that of the disk, the annular ring being made of a material having a higher coefficient of thermal expansion than that of the disk.

15. A disk file including a disk assembly comprising:
a hub, rotatable about a central axis, having a wall and a peripheral flange;
at least one data storage disk supported by the flange, the disk and flange being made from materials having dissimilar coefficients of thermal expansion;
clamping means for clamping said disk to said flange; and
compensation means located between a surface of the flange and an opposed surface of the disk, for ensuring that the disk remains concentric with the hub during temperature changes, said compensation means including:
expansion means having a coefficient of thermal expansion different to that of the hub and different to that of the disk, the expansion means being attached to the hub wall and having raised portions concentric with the hub and in non-slipping contact with the surface of the disk, wherein the coefficient of thermal expansion of the disk is intermediate the coefficient of thermal expansion of the hub and the coefficient of thermal expansion of the expansion means.

16. The disk file of claim 15, wherein said compensation means further includes means interposed between the expansion means and flange for allowing the expansion means to move radially relative to the flange during temperature changes.

17. The disk file of claim 15, wherein the hub is of steel, the disk is of aluminum and the expansion means is of magnesium or zinc.

* * * * *